A D. KILGORE.
SHAFFER STRIP GUIDE DEVICE.
APPLICATION FILED APR. 8, 1920.
1,418,653.
Patented June 6, 1922.
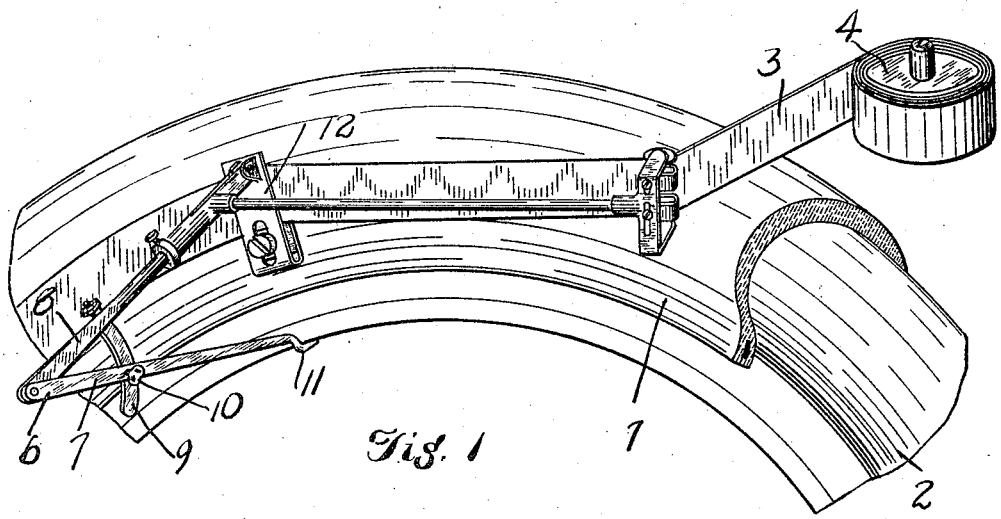
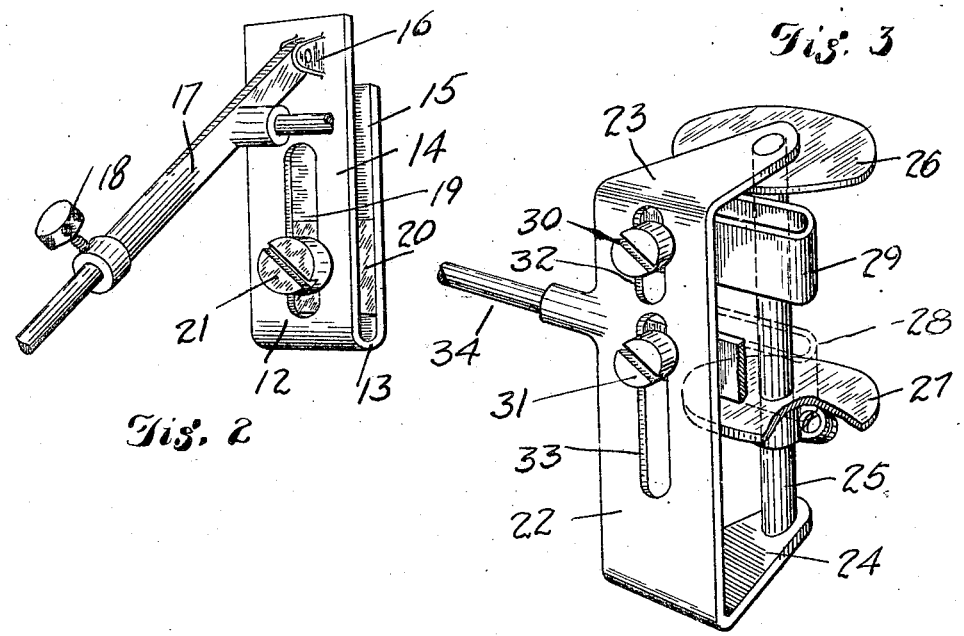
INVENTOR
A Dewey Kilgore
BY
Fetherstonhaugh & Co.
ATTORNEY

UNITED STATES PATENT OFFICE.

A DEWEY KILGORE, OF AKRON, OHIO.

SHAFFER-STRIP-GUIDE DEVICE.

1,418,653.  Specification of Letters Patent.  Patented June 6, 1922.

Application filed April 8, 1920. Serial No. 372,279.

*To all whom it may concern:*

Be it known that I, A DEWEY KILGORE, a citizen of the United States, residing at 591 South Main Street, in the city of Akron, in the county of Summit and State of Ohio, have invented certain new and useful Improvements in Shaffer-Strip-Guide Devices, of which the following is a specification.

My invention relates to improvements in the strip guides for applying an adhesive strip to a tire carcass and the object of the invention is to devise means for guiding adhesive reinforcing strip such as is known as the Shaffer strip so that it will follow the required path around the tire carcass, when applying it during the revolving of the carcass without the necessity of marking out a guide line according to the usual practice.

My invention consists of a spool bearing bracket, a spool journalled therein having one spool head adjustable, spring means carried by the bracket, for forcing the strip into contact with the spool, a compass bracket having a swinging arm adapted to receive one leg of the compass, an adjustable stop held by the compass bracket so as to bear against the inner edge of the reinforcing strip and a distance rod connecting the compass bracket and the spool bracket together, all as hereinafter more particularly described and illustrated in the accompanying drawings.

Fig. 1 is a perspective view of a portion of a tire carcass and core and adhesive strip, and showing a compass and my guiding device applied thereto.

Fig. 2 is an enlarged perspective detail of the compass bracket.

Fig. 3 is an enlarged perspective detail of the spool bracket and the spool.

In the drawings like characters of reference indicate corresponding parts in the different views.

1 indicates a portion of a tire carcass, 2 the core upon which the carcass is mounted and which is slowly revolved around a suitable central support not shown. 3 is an adhesive strip which it is designed to apply to the side of a carcass for reinforcing the side walls thereof. The strip 3 is mounted on a feed spool 4 which is supported to revolve in suitable bearings (not shown).

The practice has been in order to apply the strip to the side of a carcass, first to draw a guiding line by means of a compass around the side of the carcass and then by hand to apply the strip so as to follow such line. This was a very slow and tedious operation and required a certain amount of skilled labor.

In order to accomplish it and to overcome this I have devised the following device, by which the strip is laid accurately without the necessity of employing any guiding line.

6 indicates a compass provided with legs 7 and 8 pivotally connected together and adjusted apart by means of the arc shaped bar 9 and setscrew 10.

According to the usual practice the arm 7 is formed at 11 so as to bear against the interior periphery of the core. 12 is a compass bracket which is bent at 13 in U form, thereby providing an exterior and an interior arm 14 and 15 respectively. The arm 14 it will be noted is slightly longer than the arm 15 and is provided at its upper end with a pair of lugs 16 between which is pivoted a socket arm 17 into which the leg 8 of the compass extends, being secured therein by means of a setscrew 18.

19 is a longitudinal slot formed in the arm 14 of a compass bracket 12. 20 is a block slidably fitting between the arms 14 and 15 and held in position by a clamping screw 21 extending through the slot 19. When the clamping screw 21 is tightened the head bears against the outer face of the arm 14, drawing the block 20 into contact with the inner face of the arm. 22 is a spool bracket provided with arms 23 and 24 between which extends a shaft 25. 26 is a spool head which is secured permanently to the shaft 25 and 27 is an opposing spool head adjustably secured upon the shaft 25, so that the spool heads may be spaced apart the required distance in order to accommodate different widths of strips. 28 and 29 are spring tension fingers adapted to bear against the outer face of the strip and adjustably held in position by setscrews 30 and 31 extending through slots 32 and 33 formed in the body of the bracket 22. 34 is a distance rod connecting the brackets 12 and 22 together so as to hold them the required distance apart. When applying the strip 3 to the carcass it is passed through the bracket 22 to the inside of shaft 25, then through the bracket 12, the end being pressed upon the carcass so as to stick thereto. The block 20 is then adjusted so as to bear against the edge of the strip so that such edge will follow the required line upon the carcass. The carcass is then slowly revolved, drawing the strip through the brackets 22 and 12. The operator during the revolving of the carcass bears upon the compass 6, exerting pressure upon the bracket 12, forcing the strip into contact with the carcass.

From this description it will be seen that I have devised a very simple device whereby an adhesive strip may be accurately laid upon the side of a tire carcass without the employment of skilled labor and which may be readily adjusted to lay strips of any desired width.

What I claim as my invention is—

1. In a strip guiding device for the reinforcing strips of a tire carcass, the combination with a compass, one leg of which is adapted to bear against the inner periphery of a carcass core, of a strip guiding device connected to the other leg of the compass and through which the adhesive strip is drawn as the carcass is revolved.

2. In a strip guiding device for the reinforcing strips of a tire carcass, the combination with a compass, one leg of which is adapted to bear against the inner periphery of a carcass core, of a spool bracket, a spool rotatable in said bracket, a compass bracket connected to the opposite leg of the compass, means in the compass bracket bearing against the inner edge of the strip as it passes through the bracket and means for spacing the spool bracket and compass bracket apart.

3. In a strip guiding device for the reinforcing strips of a tire carcass, the combination with a compass, one leg of which is adapted to bear against the inner periphery of a tire carcass core, of a spool bracket, a spool rotatable in said bracket, a compass bracket connected to the opposite leg of a compass, adjustable means in the compass bracket for bearing against the inner edge of the strip as it passes through the bracket and means for spacing the spool bracket and compass apart.

4. In a strip guiding device for the reinforcing strips of a tire carcass, the combination with a compass, one leg of which is adapted to bear against the inner periphery of a carcass core, of a spool bracket, a spool rotatable in said bracket and tension means carried by the spool bracket and bearing against the outer face of the strip and carrying means whereby the bracket is supported and spaced from the other compass leg.

5. In a strip guiding device for the reinforcing strips of a tire carcass, the combination with a compass, one leg of which is adapted to bear against the inner periphery of a carcass core, of a spool bracket supported by the remaining leg of the compass in spaced relation therewith, and tension means adjustable longitudinally of the spool and bearing against the outer face of the strip.

6. Means for facilitating the placing of a reinforcing strip on a tire carcass comprising, in combination with a rotatable circular carcass carrier, a strip guiding device through which the adhesive strip is drawn as the carcass is revolved, and means whereby said guiding device may be held stationary with respect to the circle in which the carrier rotates.

7. Means for facilitating the placing of a reinforcing strip on a tire carcass, comprising in combination with a rotatable carcass carrier, a strip guiding device engaging the carrier and including a spool over which the strip is passed.

In testimony whereof I affix my signature.

A DEWEY KILGORE.